United States Patent
Taherzadeh Boroujeni et al.

(10) Patent No.: US 11,611,999 B2
(45) Date of Patent: Mar. 21, 2023

(54) PROCEDURES FOR CONCURRENT MSG2 PDCCH MONITORING

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 105 days.

(21) Appl. No.: 17/214,472

(22) Filed: Mar. 26, 2021

(65) Prior Publication Data

US 2021/0329700 A1    Oct. 21, 2021

Related U.S. Application Data

(60) Provisional application No. 63/012,016, filed on Apr. 17, 2020.

(51) Int. Cl.
*H04W 74/08* (2009.01)
*H04W 76/27* (2018.01)
(Continued)

(52) U.S. Cl.
CPC ....... *H04W 74/0833* (2013.01); *H04W 24/08* (2013.01); *H04W 24/10* (2013.01); *H04W 72/042* (2013.01); *H04W 76/27* (2018.02)

(58) Field of Classification Search
CPC . H04W 74/0833; H04W 76/27; H04W 24/08; H04W 24/10; H04W 72/042;
(Continued)

(56) References Cited

U.S. PATENT DOCUMENTS

2018/0324867 A1*  11/2018  Basu Mallick ... H04W 72/1242
2019/0104435 A1*   4/2019  Cho ................... H04W 74/0833
(Continued)

FOREIGN PATENT DOCUMENTS

WO    2018232123 A1    12/2018

OTHER PUBLICATIONS

International Search Report and Written Opinion—PCT/US2021/024717—ISA/EPO—dated Jul. 8, 2021.

*Primary Examiner* — Mewale A Ambaye
(74) *Attorney, Agent, or Firm* — Procopio, Cory, Hargreaves & Savitch LLP; Nerrie M. Zohn

(57) ABSTRACT

A configuration for a random access procedure including concurrent message 2 PDCCH monitoring with different procedures. The apparatus transmits a first random access message 1. The apparatus transmits a second random access message 1 in response to determining that a first random access message 2 control portion has not been received during a first portion of a first RAR window. The apparatus monitors for the first random access message 2 control portion and a second random access message 2 control portion concurrently during a second portion of the first RAR window. A coverage enhanced monitoring procedure for the second message 2 control portion is different than a monitoring procedure for the first message 2 control portion. The apparatus receives and decodes a random access message 2 control portion. The apparatus monitors for a random access message 2 data portion in response to decoding the random access message 2 control portion.

30 Claims, 9 Drawing Sheets

(51) Int. Cl.
*H04W 24/08* (2009.01)
*H04W 24/10* (2009.01)
*H04W 72/04* (2023.01)

(58) Field of Classification Search
CPC ..... H04W 76/10; H04W 16/14; H04W 74/08; H04W 74/0808; H04W 80/02; H04L 41/145
See application file for complete search history.

(56) References Cited

U.S. PATENT DOCUMENTS

| | | |
|---|---|---|
| 2019/0132882 A1 | 5/2019 | Li et al. |
| 2019/0215220 A1* | 7/2019 | Islam .................. H04B 7/0695 |
| 2019/0223157 A1* | 7/2019 | Hwang ............ H04L 27/26025 |
| 2020/0077446 A1* | 3/2020 | Agiwal ................ H04W 16/14 |
| 2020/0221485 A1* | 7/2020 | Cirik ........................ H04L 5/10 |
| 2020/0382254 A1* | 12/2020 | Han ..................... H04L 5/0048 |

* cited by examiner

PROCEDURES FOR CONCURRENT MSG2 PDCCH MONITORING

CROSS REFERENCE TO RELATED APPLICATION(S)

This application claims the benefit of U.S. Provisional Application Ser. No. 63/012,016, entitled "Concurrent MSG2 PDCCH Monitoring with Different Procedures" and filed on Apr. 17, 2020, which is expressly incorporated by reference herein in its entirety.

BACKGROUND

Technical Field

The present disclosure relates generally to communication systems, and more particularly, to a configuration for a random access procedure including concurrent message 2 physical downlink control channel (PDCCH) monitoring with different procedures.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Wireless communication may include a random access procedure that allows a user equipment (UE) to initiate or resume communications with a base station. Under certain channel conditions, various messages of the random access procedure may not be received correctly, which may delay or prevent the UE from connecting to the base station. Coverage for a random access procedure may be enhanced, for example, by repeating messages. Such enhancements may consume additional resources and may not be appropriate for UEs with good coverage.

In a random access procedure, a user equipment (UE) may transmit a first random access message 1. The UE may transmit a second random access message 1 in response to determining that a first random access message 2 physical downlink control channel (PDCCH) has not been received during a first portion of a first random access response (RAR) window. The second random access message 1 may be considered a request for an enhanced coverage random access message 2 PDCCH. The UE may monitor for the first message 2 PDCCH and a second message 2 PDCCH concurrently during a second portion of the first RAR window. A coverage enhanced monitoring procedure for the second message 2 PDCCH is different than a monitoring procedure for the first message 2 PDCCH. For example, the coverage enhanced monitoring procedure may monitor different PDCCH candidates, soft combine PDCCH candidates, have a different RAR window, have a different downlink control information (DCI) size, or have a different DCI interpretation. The UE may receive and decode a random access message 2 PDCCH, the random access message 2 PDCCH being one of the first random access message 2 PDCCH or the second random access message 2 PDCCH. The UE may monitor for a random access message 2 PDSCH in response to decoding the random access message 2 PDCCH. By concurrently monitoring for the first message 2 PDCCH and the second message 2 PDCCH, the UE may improve the probability of successfully receiving the message 2 PDCCH and a speed of completing a random access procedure.

In an aspect of the disclosure, a method, a computer-readable medium, and an apparatus are provided. The apparatus may be a device at a UE. The device may be a processor and/or a modem at a UE or the UE itself. The apparatus transmits a first random access message 1. The apparatus transmits a second random access message 1 in response to determining that a first random access message 2 physical downlink control channel (PDCCH) has not been received during a first portion of a first random access response (RAR) window. The apparatus monitors for the first random access message 2 PDCCH and a second random access message 2 PDCCH concurrently during a second portion of the first RAR window. A coverage enhanced monitoring procedure for the second random access message 2 PDCCH is different than a monitoring procedure for the first random access message 2 PDCCH. The apparatus receives and decodes a random access message 2 PDCCH. The random access message 2 PDCCH being one of the first random access message 2 PDCCH or the second random access message 2 PDCCH. The apparatus monitors for a random access message 2 PDSCH in response to decoding the random access message 2 PDCCH.

In an aspect of the disclosure, a method, a computer-readable medium, and an apparatus are provided. The apparatus may be a device at a base station. The device may be a processor and/or a modem at a base station or the base station itself. The apparatus receives, from a UE, a first random access message 1. The apparatus transmits a first random access message 2 PDCCH during a first RAR window in response to the first random access message 1. The apparatus receives a second random access message 1 during the RAR window. The apparatus transmits a second random access message 2 PDCCH in response to the second random access message 1 during a second portion of the first RAR window for a coverage enhanced monitoring procedure that is different than a monitoring procedure for the first random access message 2 PDCCH. The apparatus transmits a first random access message 2 PDSCH based on the first random access message 2 PDCCH and a second random access message 2 PDSCH based on the second random access message 2 PDCCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
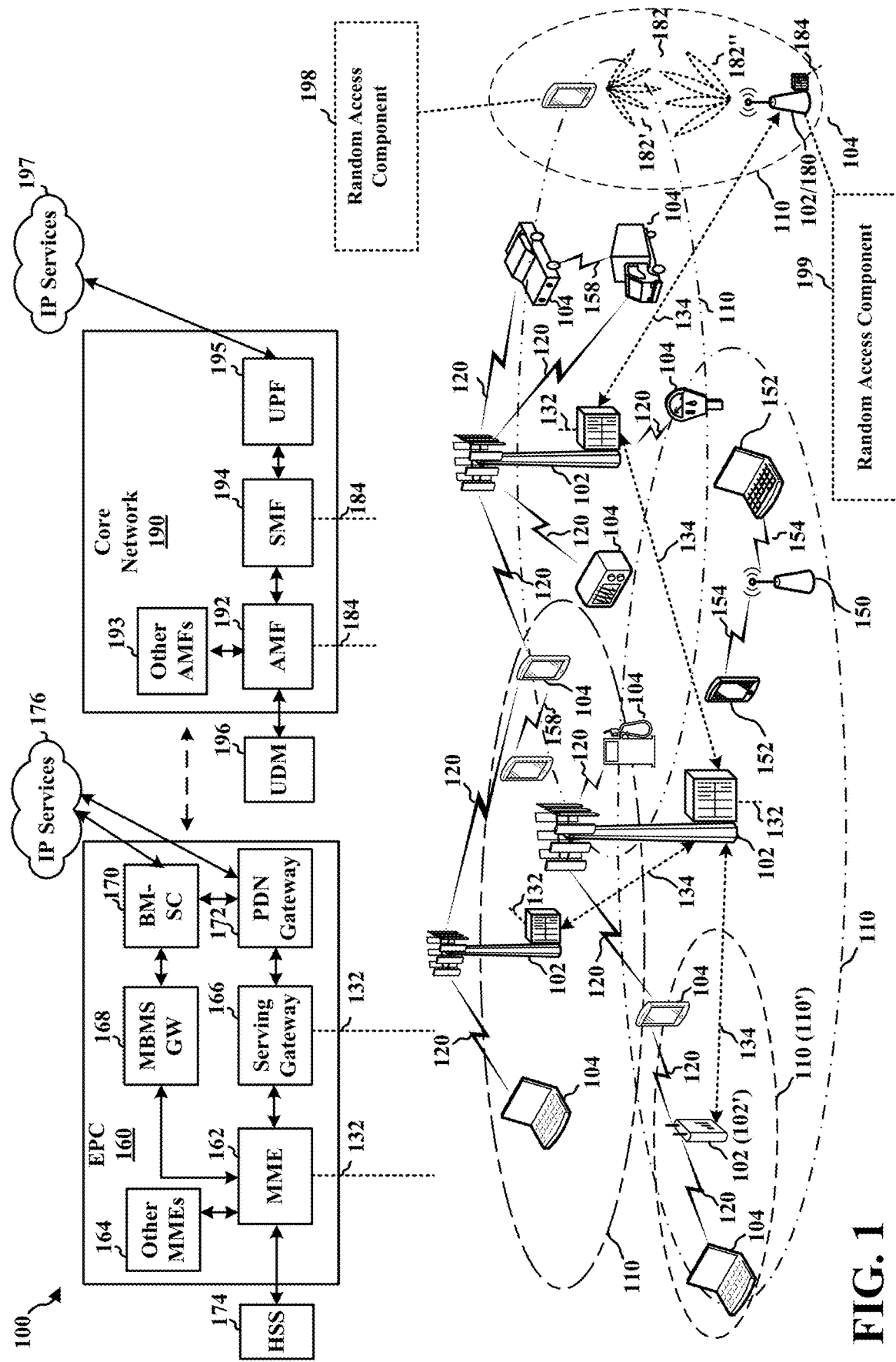
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform a random access procedure including concurrently monitoring for a first message 2 PDCCH and a second message 2 PDCCH using an enhanced coverage monitoring procedure. For example, the UE 104 may comprise a random access component 198 configured to perform a random access procedure including concurrently monitoring for a first message 2 PDCCH and a second message 2 PDCCH using an enhanced coverage monitoring procedure. The UE 104 may transmitting, from a UE, a first random access message 1. The UE 104 may transmit, from the UE, a second random access message 1 in response to determining that a first random access message 2 PDCCH has not been received during a first portion of a first RAR window. The UE 104 may monitor for the first random access message 2 PDCCH and a second random access message 2 PDCCH concurrently during a second portion of the first RAR window, wherein a coverage enhanced monitoring procedure for the second random access message 2 PDCCH is different than a monitoring procedure for the first random access message 2 PDCCH. The UE 104 may receive and decode a random access message 2 PDCCH, the random access message 2 PDCCH being one of the first random access message 2 PDCCH or the second random access message 2 PDCCH. The UE 104 may monitor for a random access message 2 PDSCH in response to decoding the random access message 2 PDCCH.

In certain aspects, the base station 180 may be configured to perform a random access procedure including transmitting a first message 2 PDCCH and a second message 2 PDCCH using an enhanced coverage procedure. For example, the base station 180 may comprise a random access component 199 configured to perform a random access procedure including transmitting a first message 2 PDCCH and a second message 2 PDCCH using an enhanced coverage procedure. The base station 180 may receive, from a UE 104, a first random access message 1. The base station 180 may transmit a first random access message 2 PDCCH during a first RAR window in response to the first random access message 1. The base station 180 may receive a second random access message 1 during the first RAR window. The base station 180 may transmit a second random access message 2 PDCCH in response to the second random access message 1 during a second portion of the first RAR window for a coverage enhanced monitoring procedure that is different than a monitoring procedure for the first random access message 2 PDCCH. The base station 180 may transmit a first random access message 2 PDSCH based on the first random access message 2 PDCCH and a second random access message 2 PDSCH based on the second random access message 2 PDCCH.

Although the following description may be focused on 5G NR, the concepts described herein may be applicable to other similar areas, such as LTE, LTE-A, CDMA, GSM, and other wireless technologies.

Figure 2:
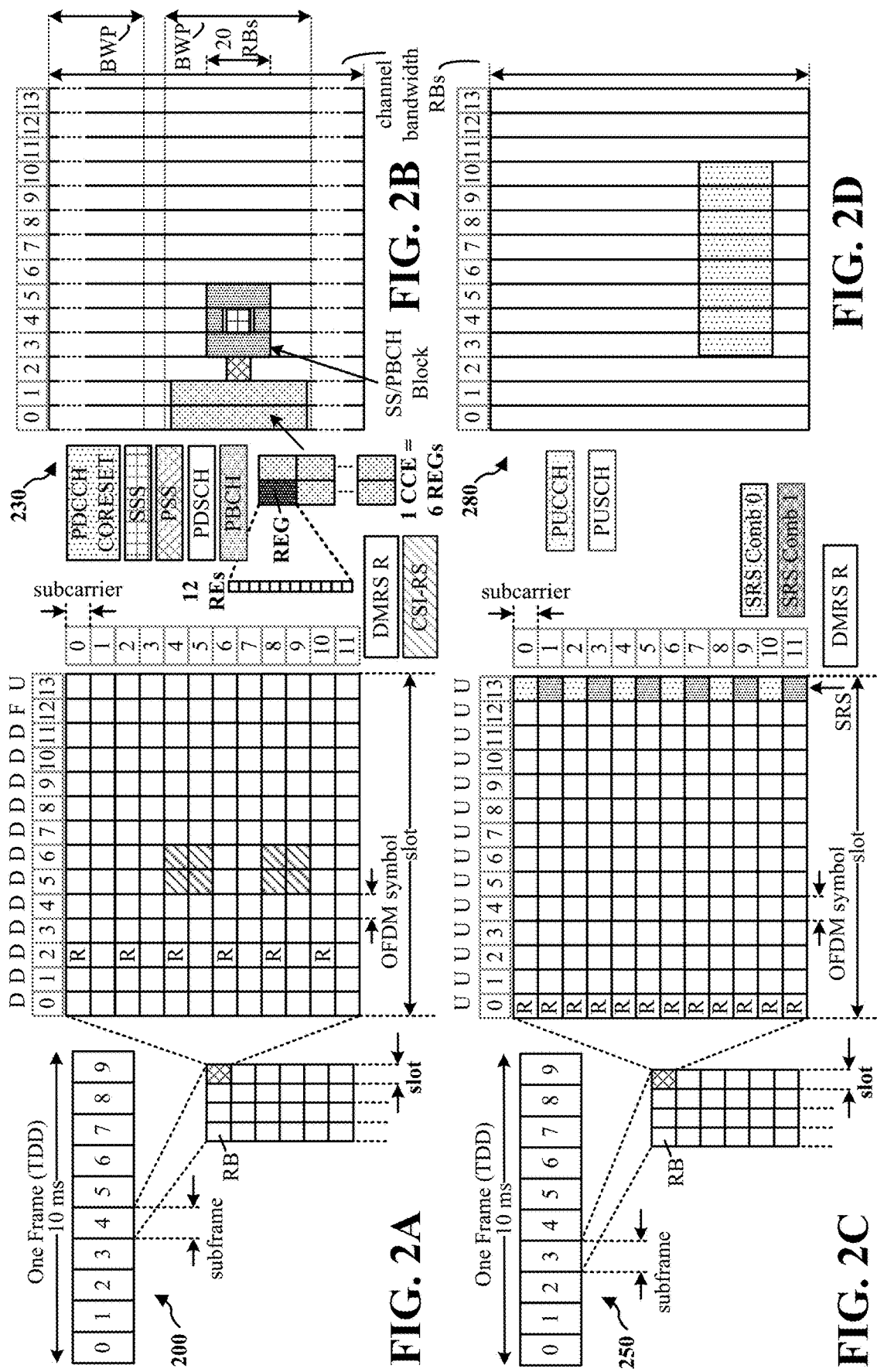
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to $2^1*15$ kHz, where y is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
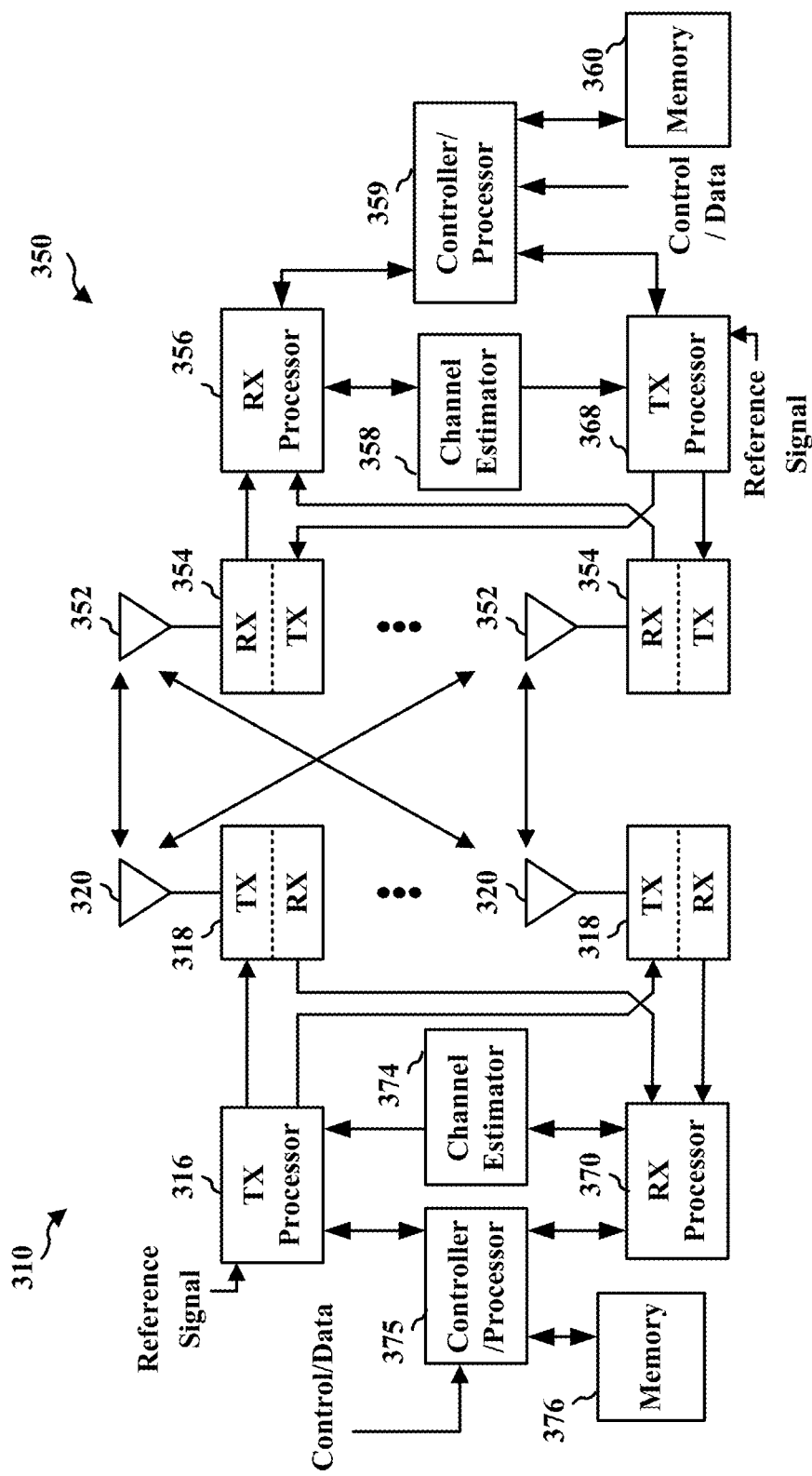
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

A UE and base station may perform a four-step random access channel (RACH) procedure for the UE to obtain initial access to the base station. The UE may acquire a cell by reading a synchronization signal block (SSB) and first system information block (SIB1). SIB1 provides initial access related parameters. The UE may sends msg1 on a physical random access channel (PRACH) with power ramping. If no msg2 random access response (RAR) is received within a RAR window based on the msg1, the UE may send the msg1 again with increased power. If the base station detects msg1, the base station sends msg2, which may include two parts: a control part transmitted on the PDCCH, and a data part transmitted on the PDSCH. The PDCCH is scrambled with a random access radio network temporary identifier (RA-RNTI), which is a function of the RACH occasion (RO) that the UE used to send the msg1. Within the PDSCH, there is a media access control (MAC) control element (CE) (MAC-CE) that acknowledges the reception of the msg1 and grants the UE an uplink (UL) grant to send msg3.

The UE may monitor the PDCCH for a downlink control information (DCI) with format 1_0 scrambled with the RA-RNTI corresponding to the RO that the UE used to transmit msg1. If the DCI is detected, the UE may proceed with PDSCH decoding. If a MAC-CE is found in the PDSCH adding to the preamble the UE used to send msg1, the UE may treat the MAC-CE as being for the UE. Accordingly, the UE may follow the UL grant of the MAC-CE to send a UE-ID in a msg3. There may be a collision from multiple UEs if they used the same preamble sequence in the same RO for sending msg1. The UEs may send the msg3 at the same resource. The base station may receive one or more msg3 and perform contention resolution. The base station may send msg4.

PRACH and msg2 PDCCH are two of the bottlenecks in the coverage of millimeter-wave 5G systems. For example, PRACH and msg2 PDCCH may be transmitted before beam training is completed. Accordingly, PRACH and msg2 PDCCH may not be correctly received when transmitted. PRACH repetition and/or using different PRACH formats can be helpful in increasing the PRACH coverage. Msg2 PDCCH repetition can be helpful for increasing coverage of msg2. These repetition techniques, however, may increase use of PRACH and control (e.g., PDCCH) resources.

In an aspect, the present disclosure may provide for improved coverage during a random access procedure by applying coverage enhancement of PRACH and msg2 PDCCH for UEs that are likely to benefit from the coverage enhancement. For example, a UE may selectively perform two or more concurrent PDCCH monitoring for msg2 PDCCH on the same slot and/or set of slots with different monitoring procedures. For instance, one of the monitoring procedures may be a coverage-enhanced random access procedure.

The coverage-enhanced random access procedure may involve different grouping of monitoring occasions for blind detection. Multiple concurrent PDCCH monitoring may be associated with the same RA-RNTI or different RA-RNTIs for blind detection. Two concurrent msg2 PDCCH monitoring may include the following two concurrent procedures: 1) regular msg2 PDCCH monitoring associated with regular random access channel (RACH) procedure and 2) msg2 PDCCH monitoring associated with a second-attempt coverage-enhanced RACH procedure, in which the UE initiates a second attempt for the four-step RACH procedure if the msg2 PDCCH (in response to the PRACH) is not received during the corresponding RAR window (or a portion of the RAR window). The second attempt coverage-enhanced RACH procedure follows an alternative four-step RACH procedure which includes one or more of the following: an alternative (e.g. coverage-enhanced) transmission method for PRACH; an alternative (e.g. coverage-enhanced) method for monitoring and reception of msg2 PDCCH; an alternative RAR window; an alternative size of DCI carried by msg2 PDCCH; or an alternative interpretation of the content of DCI carried by msg2 PDCCH. In an aspect, using the second-attempt coverage-enhanced RACH procedure may depend on previous measurements by the UE (e.g. if SSB-based RSRP is less than a certain threshold). In some cases, the second-attempt coverage-enhanced RACH procedure may surpass PDCCH blind detection limits. The UE may drop a subset of concurrent msg2 monitoring procedures (e.g. the UE may only follow msg2 PDCCH monitoring with the coverage-enhanced procedure).

In an aspect, alternative PDCCH monitoring and reception by UE, may include soft combination of multiple PDCCH candidates over multiple monitoring occasions before decoding and blind detection. For example, the base station (e.g., a gNB) repeats msg2 PDCCH over multiple monitoring occasions (e.g. PDCCH candidates with the same index over multiple slots). In the aggregated monitoring occasions for PDCCH repetition, the corresponding PDCCH candidates with the same aggregation level and location (and/or index) are paired together and the receiver performs soft combination of them, before decoding and checking the cyclic redundancy check (CRC). Monitoring occasions may be grouped into groups of k consecutive monitoring occasions and control resource set (CORESET) locations in each group of aggregated slots form one virtual monitoring occasion for the alternative msg2 PDCCH.

Figure 4:
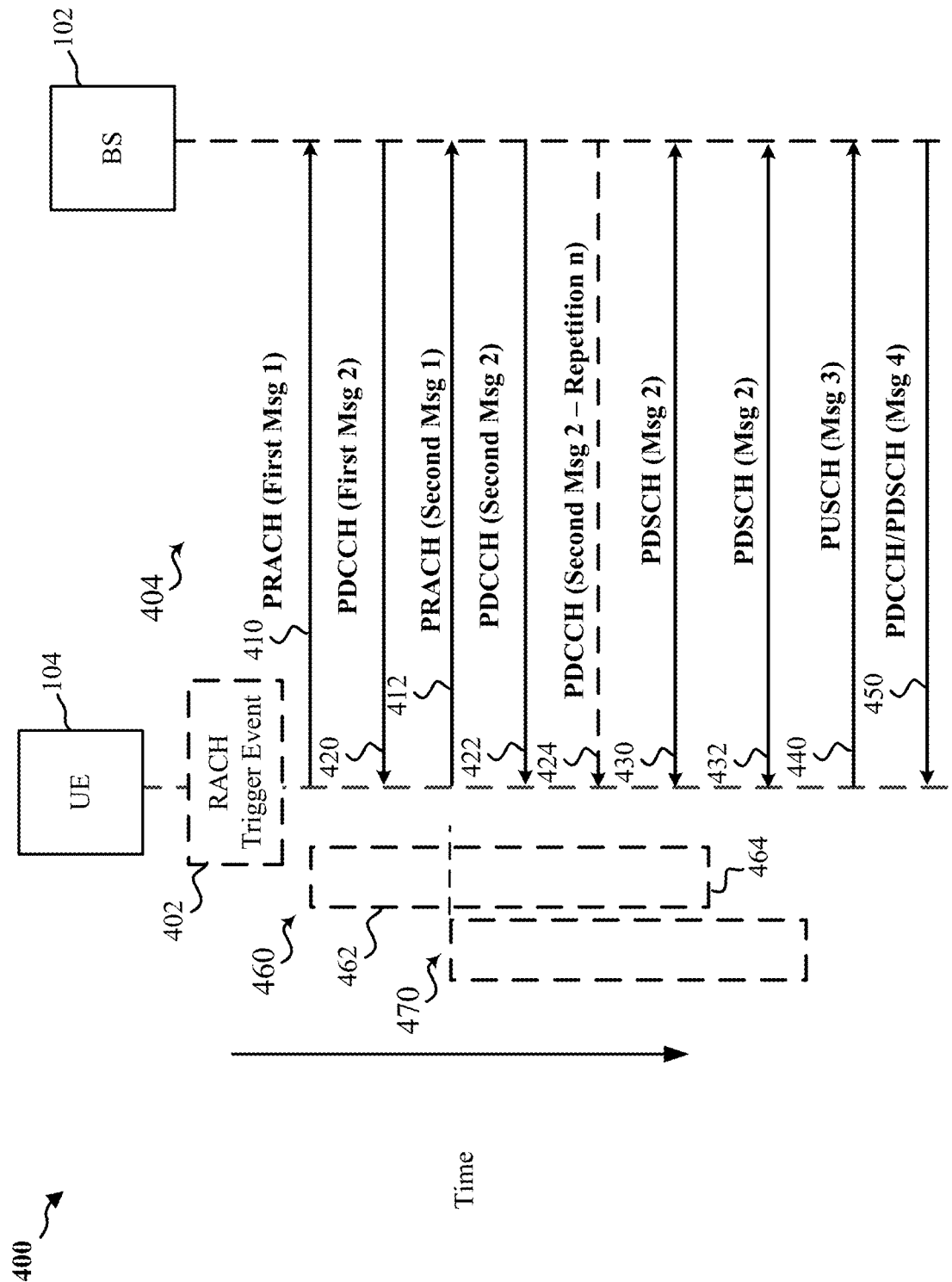
FIG. 4 is a diagram illustrating an example message exchange for a random access procedure between a base station and a UE in an access network.

FIG. 4 is a diagram 400 illustrating an example message exchange for a RACH procedure between a base station 102 and a UE 104 in an access network. The UE 104 may include a UE random access component 198. The base station 102 may include a BS random access component 199.

Referring additionally to Table 1 (below), during operation, UE 104 may execute an implementation of an NR RACH procedure 404, according to a 4-step NR RACH message flow, due to the occurrence of one or more RACH trigger events 402. Suitable examples of RACH trigger events 402 may include, but are not limited to: (i) the UE 104 performing an initial access to transition from an RRC_IDLE state to RRC_CONNECTED ACTIVE state; (ii) the UE 104 detecting downlink (DL) data arrival during while in an RRC_IDLE state or RRC_CONNECTED INACTIVE state; (iii) the UE 104 determining UL data arrival from higher layers during RRC_IDLE state or RRC_CONNECTED INACTIVE state; (iv) the UE 104 performing a handover from another station to the base station 102 during the connected mode of operation; and (v) the UE performing a connection re-establishment procedure such as a beam failure recovery procedure.

The NR RACH procedure 404 may be associated with a contention based random access procedure, or with a contention free random access procedure. In an implementation, a contention based NR RACH procedure corresponds to the following RACH trigger events 402: an initial access from RRC_IDLE to RRC_CONNECTED ACTIVE; UL data arrival during RRC_IDLE or RRC_CONNECTED INACTIVE; and a connection re-establishment. In an implementation, a contention-free NR RACH procedure corresponds to the following RACH trigger events 402: downlink (DL) data arrival during RRC_IDLE or RRC_CONNECTED INACTIVE; and, a handover during the connected mode of operation.

On the occurrence of any of the above RACH trigger events 402, the execution of the NR RACH procedure 404 may include the 4-step NR RACH message flow (see FIG. 4 and Table 1), where UE 104 exchanges messages with one or more base stations 102 to gain access to a wireless network and establish a communication connection. The messages may be referred to as random access messages 1 to 4, RACH messages 1 to 4, or may alternatively be referred to by the PHY channel carrying the message, for example, message 3 PUSCH.

TABLE 1

NR RACH procedure, including Messages and Message Content transmitted over corresponding Physical (PHY) channel(s).

| PHY Channel | Message | Message content |
| --- | --- | --- |
| PRACH | Msg 1 | RACH Preamble |
| PDCCH/PDSCH | Msg 2 | Detected RACH preamble ID, TA, TC-RNTI, backoff indicator, UL/DL grants |
| PUSCH | Msg 3 | RRC Connection request (or scheduling request and tracking area update) |
| PDCCH/PDSCH | Msg 4 | Contention resolution message |

In a first step of a first RACH procedure, for example, UE 104 may transmit a first message (Msg 1) 410, which may be referred to as a random access request message, to one or more base stations 102 via a physical channel, such as a physical random access channel (PRACH). For example, Msg 1 may include one or more of a RACH preamble and a resource requirement. The UE 104 may transmit the Msg 1 on a RACH occasion (RO). In an aspect, the RACH preamble may be a relatively long preamble sequence, which may be easier for the base station 102 to receive than an OFDM symbol. In an aspect, the UE 104 may select a beam for transmission of the Msg 1 based on received synchronization signal blocks (SSBs) transmitted by the base station 102.

In a second step, the base station 102 may respond to Msg 1 by transmitting a second message (Msg 2), which may be referred to as a random access response (RAR) message. The RAR message may include a control portion 420 (e.g., PDCCH portion) and a data portion 430 (e.g., PDSCH portion). In an aspect, the UE 104 may monitor the PDCCH during a first RAR window 460 based on the first Msg 1 410 to detect a PDCCH portion 420 of the first RAR message as a DCI format 1_0 with a CRC scrambled by a RA-RNTI corresponding to the first Msg 1 410 and receive the PDSCH portion 430 of the RAR message as a transport block in a corresponding PDSCH within the RAR window 460.

In an aspect, to improve coverage of the PRACH and/or the Msg 2 PDCCH, an enhanced coverage RACH procedure may be used concurrently with the first RACH procedure. For example, the UE 104 may transmit a second Msg 1 412 on the PRACH in response to determining that the PDCCH portion 420 of the first RAR message is not received during a first portion 462 of the first RAR window 460. That is, the UE 104 may be configured to start a second, concurrent, enhanced coverage RACH procedure when such a procedure may be helpful. For example, the UE 104 may transmit the second Msg 1 412 in response to a measurement by the UE 104 (e.g., if SSB-based RSRP is less than a certain threshold). The UE 104 may use a coverage-enhanced transmission method for the second Msg 1 412. For instance, the UE 104 may repeat transmission of the second Msg 1 412 on different ROs.

The base station 102 may respond to the second Msg 1 412 by transmitting a second control portion 422 (e.g., PDCCH portion) of a second Msg 2. The base station 102 may transmit the second PDCCH portion 422 of the second Msg 2 using a coverage-enhanced transmission technique. For example, the base station 102 may repeat the transmission of the second PDCCH portion 422 as one or more repetitions 424. In an implementation, the base station 102 may repeat the Msg 2 on corresponding PDCCH candidates within a random access search space on consecutive slots. In an aspect, the BS 102 may determine whether to repeat the PDCCH portion of Msg 2 based on the second Msg 1 412. For example, the UE 104 may indicate a request for coverage enhancement based on one or a combination of: time resources of the Msg 1, format of the Msg 1, or a sequence of the Msg 1. For example, a subset of the available PRACH sequences may be associated with coverage enhancement.

For example, the BS 102 may determine that a preamble of the second Msg 1 412 follows a pattern to request coverage enhancement. In an implementation, the base station 102 may repeat the PDCCH portion of the Msg 2 using different refined beams. In an aspect, each of the different refined beams may be a sub-beam of a beam corresponding to the Msg 1. A sub-beam may refer to a lower level beam in a hierarchical set of beams. For example, a layer 1 (L1) beam may cover multiple L2 beams, which may each cover multiple L3 beams. In an implementation, the beam corresponding to Msg 1 is an L2 beam and each of the different refined beams is an L3 beam.

As another example, the second PDCCH portion 422 may utilize an alternative size of the DCI or an alternative interpretation of the content of the DCI. In an aspect, the base station 102 may transmit the second PDCCH portion 422 and any repetitions 424 during the second portion 464 of the first RAR window 460. In some implementations, a second RAR window 470 for the second PDCCH portion 422 and any repetitions 424 may be defined based on the second Msg 1 412. The second RAR window 470 may overlap the second portion 464 of the RAR window 460.

The UE 104 may concurrently monitor for the PDCCH portion 420 of the first Msg 2 and monitor for the second PDCCH portion 422 of a second Msg 2 during the second portion 464 of the RAR window 460. The UE 104 may monitor for the second PDCCH portion 422 using a coverage-enhanced monitoring procedure. For example, the UE 104 may perform soft combining on PDCCH candidates for two or more repetitions of the second PDCCH portion 422. The UE 104 may perform blind detection after soft combination of the PDCCH candidates. That is, the UE 104 may receive a signal corresponding to each of the PDCCH candidates, soft combine the signals received for each of the PDCCH candidates, and perform blind detection for the DCI on the combined signal. Accordingly, the UE 104 may be more likely to successfully detect the Msg 2 PDCCH. As another example, the UE may monitor for an alternative size of DCI. As another example, the UE may apply an alternative interpretation to content of a DCI received according to the coverage-enhanced monitoring procedure.

The base station 102 may transmit a first data portion 430 (e.g., PDSCH portion) of the Msg 2 and a second data portion 432 (e.g., PDSCH portion) of the Msg 2. Because the UE 104 may successfully decode either the first PDCCH portion 420 or the second PDCCH portion 422, transmitting both PDSCH portions 430, 432 may allow the UE 104 to receive the complete Msg2 based on either PDCCH portion 420, 422.

The UE 104 may receive a transport block in a corresponding PDSCH indicated by a successfully decoded one of the first PDCCH portion 420 or the second PDCCH portion 422. The UE 104 may decode transport block and parse the transport block for a random access preamble identity (RAPID) associated with the Msg 1. For example, Msg 2 may include one or more of a detected preamble identifier (ID), a timing advance (TA) value, a temporary cell radio network temporary identifier (TC-RNTI), a back-off indicator, an UL grant, and a DL grant. If the UE 104 identifies a RAPID corresponding to either the first Msg 1 410 or the second Msg 1 412 in the transport block, the UE 104 may identify a corresponding UL grant for Msg 3. This is referred to as RAR UL grant in the physical layer.

In response to receiving Msg 2, UE 104 transmits to the base station 102 a third message (Msg 3) 440, which may be an RRC connection request or a scheduling request, via a physical uplink channel such as PUSCH based on the RAR UL grant provided in Msg 2 of a selected serving base station 102.

In response to receiving Msg 3 440, base station 102 may transmit a fourth message (Msg 4) 450, which may be referred to as a contention resolution message, to UE 104 via a PDCCH and a PDSCH. For example, Msg 4 may include a cell radio network temporary identifier (C-RNTI) for UE 104 to use in subsequent communications.

In some example scenarios, a collision between two or more UEs 104 requesting access can occur. For instance, two or more UEs 104 may send Msg 1 having a same RACH preamble because the number of RACH preambles may be limited and may be randomly selected by each UE 104 in a contention-based NR RACH procedure. As such, each colliding UE 104 that selects the same RACH preamble will receive the same temporary C-RNTI and the same UL grant, and thus each UE 104 may send a similar Msg 3. In this case, base station 102 may resolve the collision in one or more ways. In a first scenario, a respective Msg 3 from each colliding UE 104 may interfere with the other Msg 3, so base station 102 may not send Msg 4. Then each UE 104 will retransmit Msg 1 with a different RACH preamble. In a second scenario, base station 102 may successfully decode one Msg 3 of the colliding Msg 3 and send an ACK message to the UE 104 corresponding to the successfully decoded Msg 3. In a third scenario, base station 102 may successfully decode the Msg 3 from each colliding UE 104, and then send a Msg 4 having a contention resolution identifier (such as an identifier tied to one of the UEs) to each of the colliding UEs. Each colliding UE 104 receives the Msg 4, decodes the Msg 4, and determines if the UE 104 is the correct UE by successfully matching or identifying the contention resolution identifier. Such a problem may not occur in a contention-free NR RACH procedure, as in that case, base station 102 may inform UE 104 of which RACH preamble to use.

Figure 5:
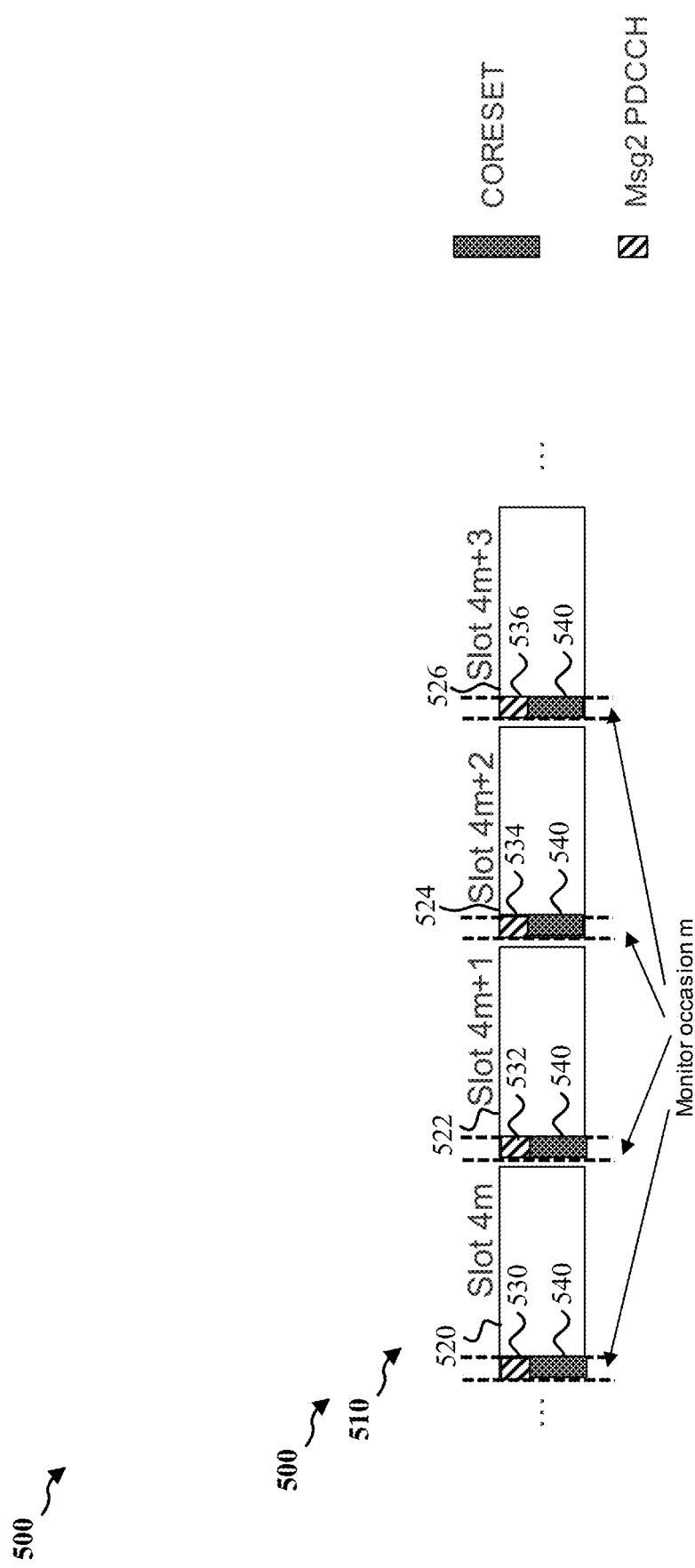
FIG. 5 is a resource diagram illustrating resources for receiving the PDCCH portion of a Msg 2 using a coverage-enhanced reception procedure.

FIG. 5 is a resource diagram 500 illustrating resources for receiving the PDCCH portion of a Msg 2 using a coverage-enhanced reception procedure (e.g., for the second PDCCH portion 422 and repetitions 424). The resources 510 may be located within consecutive slots 520, 522, 524, and 526, which may be during a RAR window. The base station 102 may repeat msg2 PDCCH over multiple monitoring occasions (e.g., PDCCH candidates with the same index over multiple slots). For example, the base station 102 may transmit a repetition of the Msg 2 on PDCCH candidates 530, 532, 534, and 536 in each slot 520, 522, 524, and 526, for example, using a different refined beam. The PDCCH candidates 530, 532, 534, and 536 may be located within a random access search space portion of the control resource set (CORESET) 540. That is, each PDCCH candidate 530, 532, 534, and 536 may include the same data, but be transmitted with different beamforming parameters. For example, the base station 102 may utilize different L3 refined beams to transmit each repetition of the Msg 2 on the PDCCH candidates 530, 532, 534, and 536 in a respective slot 520, 522, 524, and 526. The L3 refined beams may be based on an L2 beam used for the Msg 1. That is, the base station 102 may generate different sub-beams of the L2 beam to attempt to improve reception of the Msg 2.

In an aspect, the UE 104 may perform an enhanced monitoring procedure on the PDCCH candidates 530, 532, 534, and 536. For example, the UE 104 may perform soft combination of the signals corresponding to the plurality of repeated PDCCH candidates. In the aggregated monitoring occasions for PDCCH repetition, the corresponding PDCCH candidates with the same aggregation level and location (and/or index) may be grouped together. For example, monitoring occasions may be grouped to groups of k consecutive monitoring occasions and CORESET locations in each group of aggregated slots may form one virtual monitoring occasion for the alternative Msg 2 PDCCH. The receiver may perform soft combination on all monitoring occasions within the virtual monitoring occasion before decoding and checking CRC. The UE 104 may perform blind detection of the DCI format 1_0 on the combined signal after the soft combination. Accordingly, the likelihood of successful detection may be increased by the soft combination.

Figure 6:
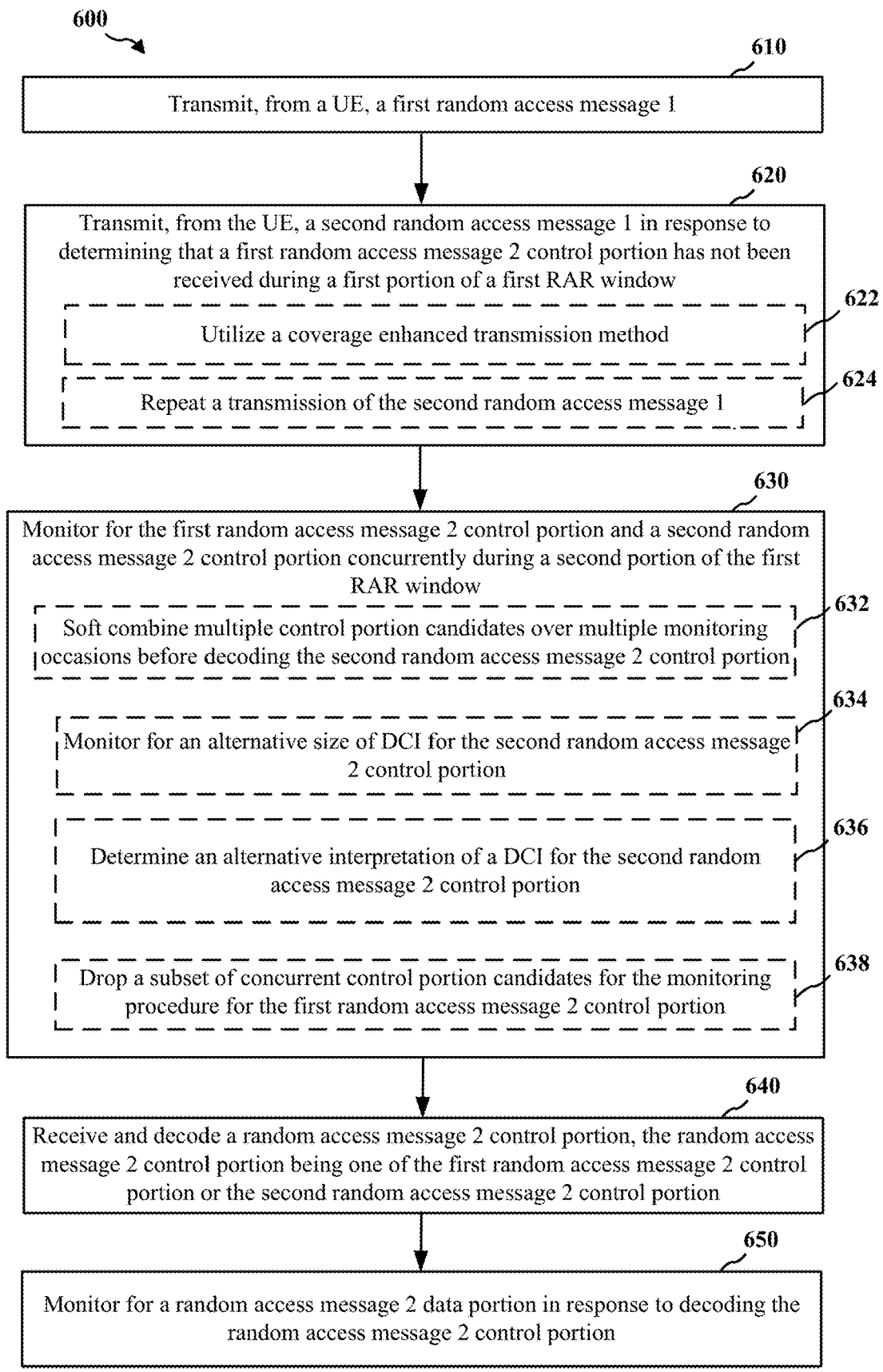
FIG. 6 is a flowchart of a method of wireless communication.

FIG. 6 is a flowchart 600 of a method of wireless communication. The method may be performed by a UE or a component of a UE (e.g., the UE 104; the apparatus 702; the cellular baseband processor 704, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to concurrently perform two monitoring procedures for a random access message 2 PDCCH, thereby allowing the UE to improve coverage of the message 2 PDCCH.

At 610, the UE may transmit a first random access message 1. For example, 610 may be performed by random access component 740 of apparatus 702. The UE may transmit the first random access message 1 to the base station. For example, the random access component 740 may select a first random access preamble for transmission on the PRACH. The random access component 740 may provide the first random access preamble to the transmission component 734 for transmission.

At 620, the UE may transmit, from the UE, a second random access message 1. For example, 620 may be performed by random access component 740 of apparatus 702. The UE may transmit the second random access message 1 in response to determining that a first random access message 2 PDCCH has not been received during a first portion of a first RAR window. In some aspects, the UE may determines whether the first random access message 2 PDCCH (e.g., PDCCH portion 420) has been received during the first portion of the RAR window. The UE may indicate to the random access component 740 when the PDCCH portion has not been received during the first portion of the RAR window. The UE may select a second random access preamble for transmission on the PRACH for the second message 1. The second random access preamble may be the same or different than the first random access preamble.

In some aspects, for example at 622, the UE may utilize a coverage enhanced transmission method for transmitting the second random access message 1. For example, 622 may be performed by random access component 740 of apparatus 702. In some aspects, the coverage enhanced transmission method may include using different beam and/or multiple repetitions. In some aspects, the UE may transmit the second random access message 1 over different beams. For example, at 624, the random access component 740 may repeat transmission of the second message 1. Each transmission may be on a different beam.

At 630, the UE may monitor for the first random access message 2 PDCCH and a second random access message 2 PDCCH concurrently during a second portion of the first RAR window. For example, 630 may be performed by monitor component 742 of apparatus 702. In some aspects, a coverage enhanced monitoring procedure for the second random access message 2 PDCCH may be different than a monitoring procedure for the first random access message 2 PDCCH. For example, the monitoring component 742 may monitor for the first message 2 PDCCH using a standard monitoring procedure (e.g., blind decoding each PDCCH candidate within the RAR window). The monitoring component 742 may monitor for the second message 2 PDCCH using a coverage enhanced monitoring procedure. For example, at 632, for the coverage enhanced monitoring procedure, the monitoring component 742 may include soft combine multiple PDCCH candidates over multiple monitoring occasions before decoding the second random access message 2. For instance, the monitoring component 742 may add the log likelihood ratios (LLRs) for received signals of the PDCCH candidates together before performing a decoding procedure on the combined signals. As another example, at 634, the monitoring component 742 may monitor for an alternative size of DCI for the second random access message 2 PDCCH. The alternative size may be based on a different configuration of the DCI format for a second random access message 2 PDCCH. Similarly, at 636, the monitoring component 742 may determine an alternative interpretation of a DCI for the second random access message 2 PDCCH. The alternative interpretation may be based on a different configuration of the DCI format for the second random access message 2 PDCCH. In some cases, concurrently monitoring for the first random access message 2 PDCCH and the second random access message 2 PDCCH may use more PDCCH candidates and/or blind detection operations than a defined limit. In such cases, the monitoring component 742, at 638, may drop a subset of concurrent PDCCH candidates for the monitoring procedure for the first random access message 2 PDCCH. That is, the monitoring component 742 may allocate processing resources to the coverage enhanced monitoring procedure, which may be more likely to detect a random access message 2 PDCCH.

At 640, the UE may receive and decode a random access message 2 PDCCH. For example, 640 may be performed by decoding component 744 of apparatus 702. In some aspects, the random access message 2 PDCCH may be one of the first random access message 2 PDCCH or the second random access message 2 PDCCH. For example, the decoding component 744 receives and decodes the random access message 2 first PDSCH portion or PDSCH portion. For instance, the decoding component 744 may successfully decode the PDCCH portion to obtain a DCI that includes time and frequency domain resources for the PDSCH portion. Accordingly, the decoding component 744 may instruct the reception component 730 to receive the signals for the PDSCH portion on the indicated resources.

At 650, the UE may monitor for a random access message 2 PDSCH. For example, 650 may be performed by PDSCH component 746 of apparatus 702. The UE may monitor for the random access message 2 PDSCH, in response to decoding the random access message 2 PDCCH. For example, the PDSCH component 746 receives the signals for the PDSCH portion indicated by the successfully decoded message 2 PDCCH.

Figure 7:
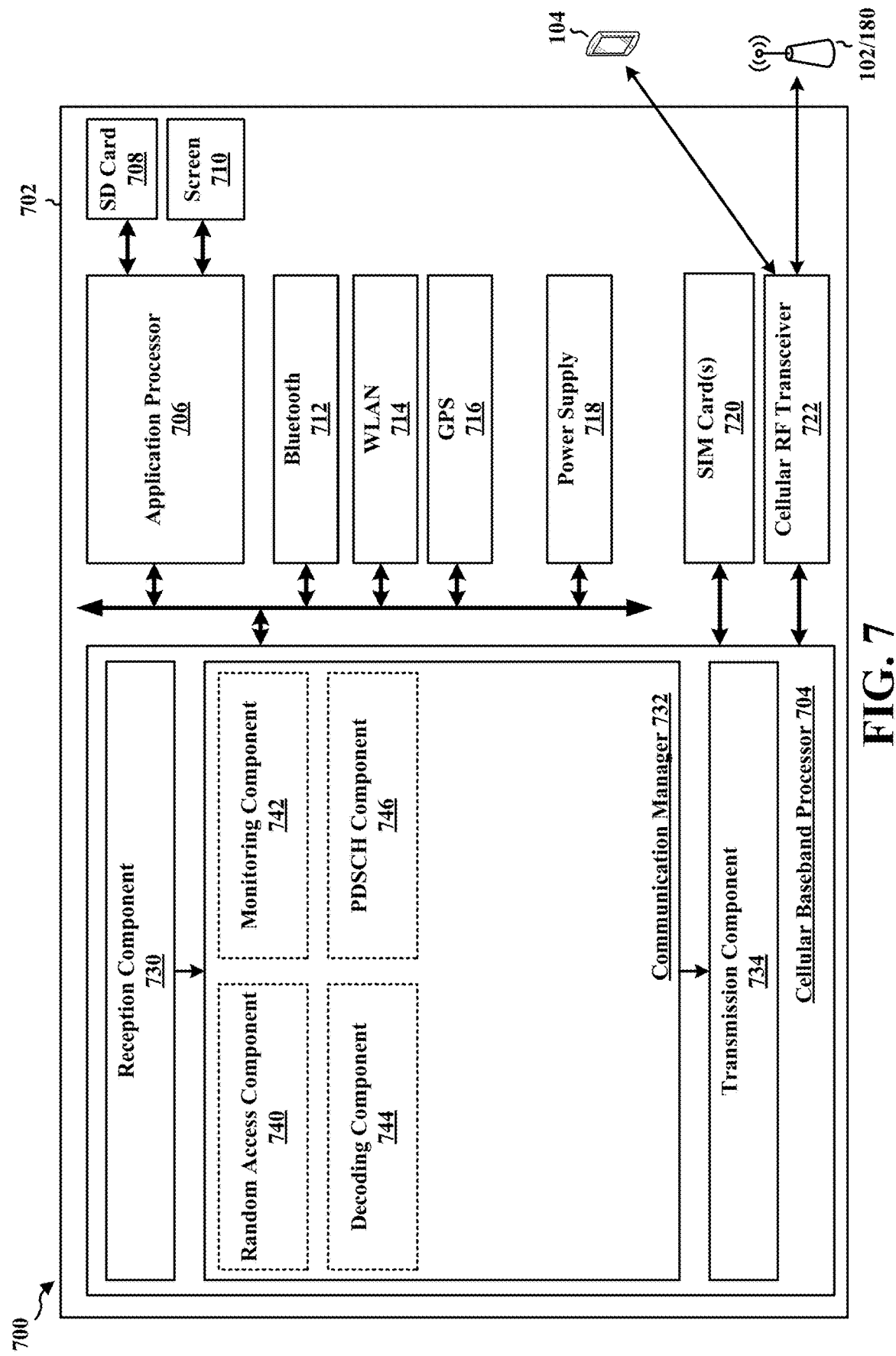
FIG. 7 is a diagram illustrating an example of a hardware implementation for an example apparatus.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the cellular baseband processor 704, and in another configuration, the apparatus 702 may be the entire UE (e.g., see 350 of FIG. 3) and include the aforediscussed additional modules of the apparatus 702.

The communication manager 732 includes a random access component 740 that is configured to transmit a first random access message, e.g., as described in connection with 610 of FIG. 6. The random access component 740 may be configured to transmit, from the UE, a second random access message 1, e.g., as described in connection with 620 of FIG. 6. The random access component 740 may be configured to utilize a coverage enhanced transmission method for transmitting the second random access message 1, e.g., as described in connection with 622 of FIG. 6. The random access component 740 may be configured to repeat transmission of the second message 1, e.g., as described in connection with 624 of FIG. 6. The communication manager 732 further includes a monitoring component 742 that is configured to monitor for the first random access message 2 PDCCH and a second random access message 2 PDCCH concurrently during a second portion of the first RAR window, e.g., as described in connection with 630 of FIG. 6. The monitoring component 742 may be configured to soft combine multiple PDCCH candidates over multiple monitoring occasions before decoding the second random access message 2, e.g., as described in connection with 632 of FIG. 6. The monitoring component 742 may be configured to monitor for an alternative size of DCI for the second random access message 2 PDCCH, e.g., as described in connection with 634 of FIG. 6. The monitoring component 742 may be configured to determine an alternative interpretation of a DCI for the second random access message 2 PDCCH, e.g., as described in connection with 636 of FIG. 6. The monitoring component 742 may be configured to drop a subset of concurrent PDCCH candidates for the monitoring procedure for the first random access message 2 PDCCH, e.g., as described in connection with 638 of FIG. 6. The communication manager 732 further includes a decoding component 744 that is configured to receive and decode a random access message 2 PDCCH, e.g., as described in connection with 640 of FIG. 6. The communication manager 732 further includes a PDSCH component 746 that is configured to monitor for a random access message 2 PDSCH, e.g., as described in connection with 650 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for transmitting, from the UE, a first random access message 1. The apparatus includes means for transmitting, from the UE, a second random access message 1 in response to determining that a first random access message 2 PDCCH has not been received during a first portion of a first RAR window. The apparatus includes means for monitoring for the first random access message 2 PDCCH and a second random access message 2 PDCCH concurrently during a second portion of the first RAR window. A coverage enhanced monitoring procedure for the second random access message 2 PDCCH is different than a monitoring procedure for the first random access message 2 PDCCH. The apparatus includes means for receiving and decoding a random access message 2 PDCCH, the random access message 2 PDCCH being one of the first random access message 2 PDCCH or the second random access message 2 PDCCH. The apparatus includes means for monitoring for a random access message 2 PDSCH in response to decoding the random access message 2 PDCCH. The means for transmitting the second random access message 1 is configured to utilize a coverage enhanced transmission method. The means for transmitting the second random access message 1 is configured to repeat a transmission of the second random access message 1. The apparatus further includes means for soft combining multiple PDCCH candidates over multiple monitoring occasions before decoding the second random access message 2 PDCCH. The apparatus further includes means for monitoring for an alternative size of DCI for the second random access message 2 PDCCH. The apparatus further includes means for determining an alternative interpretation of a DCI for the second random access message 2 PDCCH. The apparatus further includes means for dropping a subset of concurrent PDCCH candidates for the monitoring procedure for the first random access message 2 PDCCH. The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
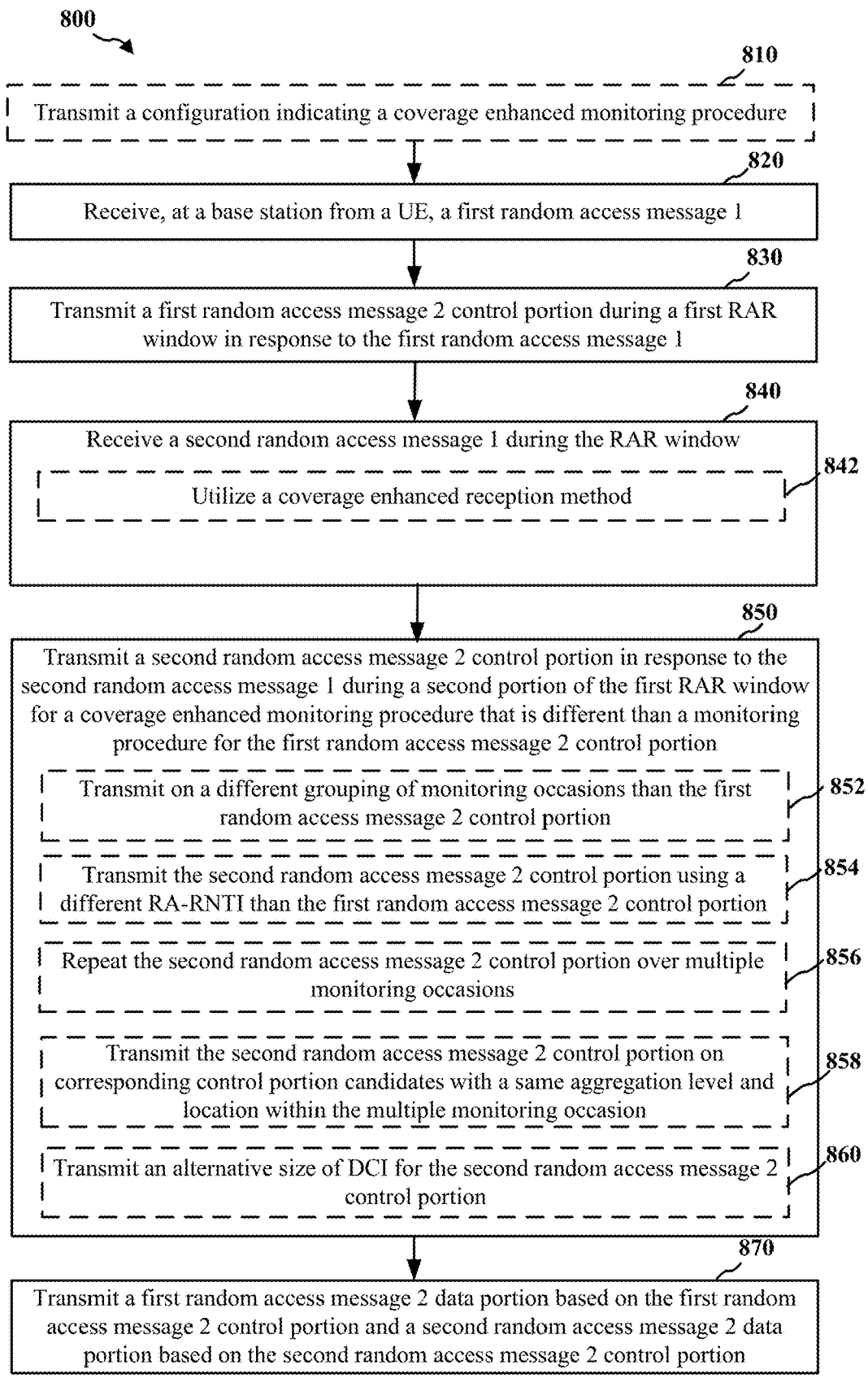
FIG. 8 is a flowchart of a method of wireless communication.

FIG. 8 is a flowchart 800 of a method of wireless communication. The method may be performed by a base station or a component of a base station (e.g., the base station 102/180; the apparatus 902; the baseband unit 904, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to allow a base station to transmit a message 2 PDCCH for two concurrent monitoring procedures, thereby enhancing coverage of the message 2 PDCCH.

In some aspects, for example at 810, the base station may transmit a configuration indicating a coverage enhanced monitoring procedure. For example, 810 may be performed by configuration component 940 of apparatus 902. The base station may transmit the configuration indicating the coverage enhanced monitoring procedure to the UE. For example, the configuration may indicate a duration of a first portion of a RAR window before a UE may transmit a second random access message 1, a repetition pattern for second random access message 2 PDCCH, a duration of a second RAR window, an alternative DCI size, or an alternative DCI interpretation. The base station may transmit the configuration indicating the coverage enhanced monitoring procedure as system information or an RRC configuration message.

At 820, the base station may receive, from a UE, a first random access message 1. For example, 820 may be performed by random access component 942 of apparatus 902. In some aspects, the base station may receive signals for a PRACH during an RO. The base station may provide the PRACH to the random access component 942 to decode. The random access component 942 may determine a PRACH preamble transmitted by a UE and determine a RAR window based on the RO.

At 830, the base station may transmit a first random access message 2 PDCCH during a first RAR window. For example, 830 may be performed by random access component 942 of apparatus 902. The base station may transmit a first random access message 2 PDCCH during a first RAR window in response to the first random access message 1. The base station may transmit the first random access message 2 PDCCH (e.g., first PDCCH portion 420) during the first RAR window in response to the first Msg 1. The base station may schedule the first PDCCH portion during a monitoring occasion of the first RAR window according to a first monitoring procedure.

At 840, the base station may receive a second random access message 1. For example, 840 may be performed by random access component 942 of apparatus 902. In some aspects, the base station may receive the second random access message 1, from the UE, in response to the UE determining that the first random access message 2 PDCCH has not been received, by the UE, during a first portion of the first RAR window. In some aspects, for example at 842, the base station may utilize a coverage enhanced caption method. For example, 842 may be performed by the random access component 942. The random access component 942 may be configured to utilize a coverage enhanced caption method. For example, second random access message 1 may be repeated and the random access component 942 may combine multiple ROs to detect the second random access message 1.

At 850, the base station may transmit a second random access message 2 PDCCH. For example, 850 may be performed by random access component 942 of apparatus 902. The base station may transmit the second random access message 2 PDCCH in response to the second random access message 1 during a second portion of the first RAR window for a coverage enhanced monitoring procedure. The coverage enhanced monitoring procedure may be different than a monitoring procedure for the first random access message 2 PDCCH. In some aspects, for example, the base station may include a coverage enhancement component 946 that determines whether to transmit the second random access message 2 according to the coverage enhanced monitoring procedure. For example, the coverage enhancement component 946 may receive the PRACH preamble for the second random access message 1 and determine whether the second random access message 1 is a request for enhanced coverage. For instance, the coverage enhancement component 946 may determine that enhanced coverage is requested when the PRACH preamble is repeated following a pattern specified in the enhanced coverage configuration. The coverage enhancement component 946 may provide a signal to the random access component 942 indicating that the second random access message 1 has requested enhanced coverage. The random access component 942 may then transmit the second random access message 2 PDCCH according to the coverage enhanced monitoring procedure.

In some aspects, for example at 852, the base station may transmit the second random access message 2 on a different grouping of monitoring occasions than the first random access message 2 PDCCH. For example, 852 may be performed by the random access component 942 of apparatus 902. In some aspects, for example at 854, the base station may transmit the second random access message 2 PDCCH using a different RA-RNTI than the first random access message 2 PDCCH. For example, 854 may be performed by the random access component 942 of apparatus 902. In some aspects, for example at 856, the base station may repeat the second random access message 2 PDCCH over multiple monitoring occasions. For example, 856 may be performed by the random access component 942 of apparatus 902. In some aspects, for example at 858, the base station may transmit the second random access message 2 PDCCH on corresponding PDCCH candidates with a same aggregation level and location within the multiple monitoring occasion. For example, 858 may be performed by the random access component 942 of apparatus 902. In some aspects, for example at 860, the base station may transmit an alternative size of DCI for the second random access message 2 PDCCH. For example, 860 may be performed by the random access component 942 of apparatus 902. The second random access message 2 PDCCH may have an alternative interpretation compared to the first random access message 2 PDCCH.

At 870, the base station may transmit a first random access message 2 PDSCH based on the first random access message 2 PDCCH and a second random access message 2 PDSCH based on the second random access message 2 PDCCH. For example, 870 may be performed by PDSCH component 944 of apparatus 902. For example, the PDSCH component 902 may transmit the first random access message 2 PDSCH (e.g., first Msg 2 PDSCH portion 430) based on the first random access message 2 PDCCH (e.g., first Msg 2 PDCCH portion 420) and a second random access message 2 PDSCH (e.g., second Msg 2 PDSCH portion 432) based on the second random access message 2 PDCCH (e.g., second Msg 2 PDCCH portion 422). The PDSCH component 944 may receive an indication of the PDSCH resources from the random access component 942, which transmitted the indication in the DCI. The PDSCH component 944 may generate a RAR message including an UL grant for the Msg 3.

Figure 9:
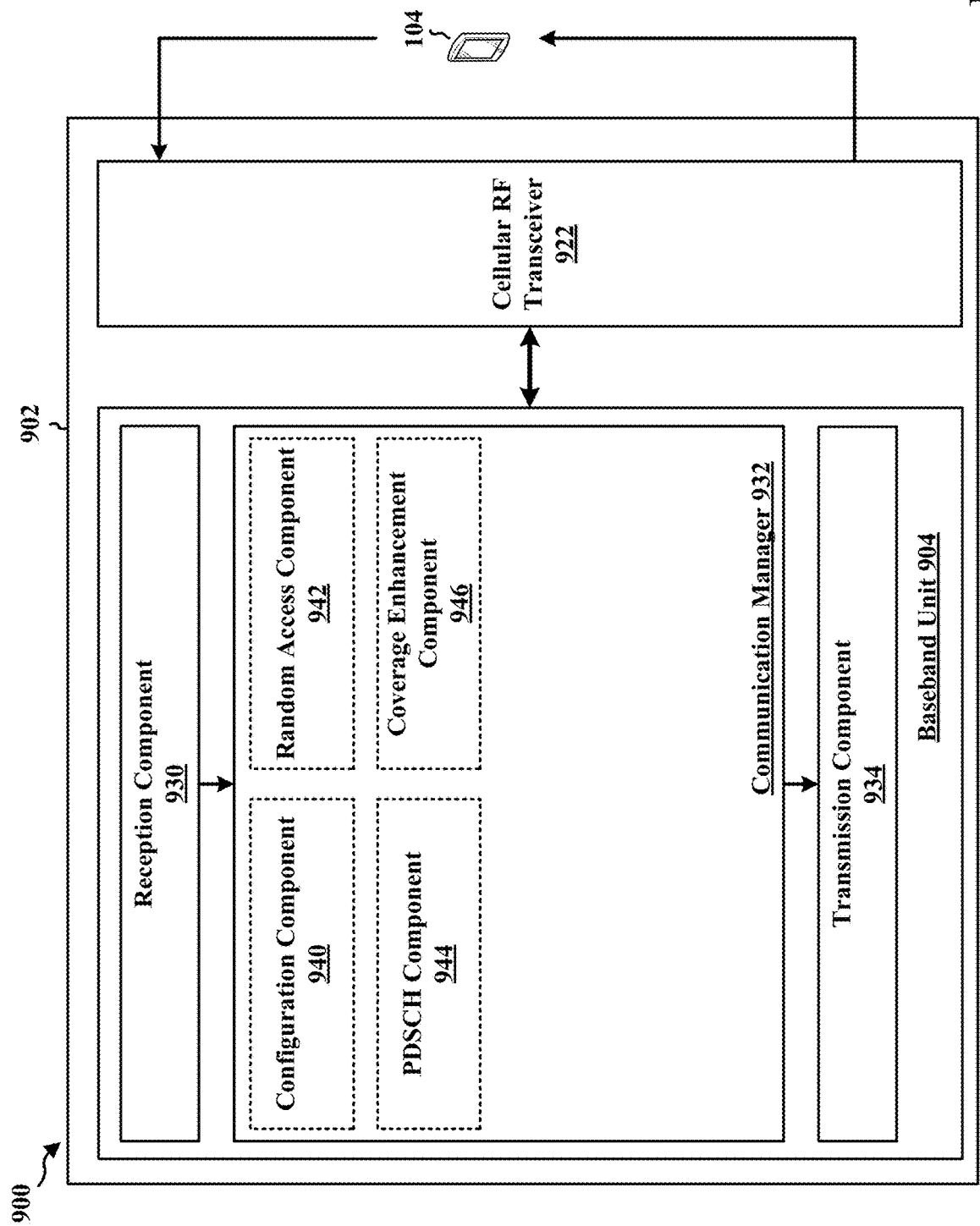
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/ memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a configuration component 940 that may transmit a configuration indicating a coverage enhanced monitoring procedure, e.g., as described in connection with 810 of FIG. 8. The communication manager 932 further includes a random access component 942 that receive, from a UE, a first random access message 1, e.g., as described in connection with 820 of FIG. 8. The random access component 942 may be configured to transmit a first random access message 2 PDCCH during a first RAR window, e.g., as described in connection with 830 of FIG. 8. The random access component 942 may be configured to receive a second random access message 1, e.g., as described in connection with 840 of FIG. 8. The random access component 942 may be configured to utilize a coverage enhanced caption method, e.g., as described in connection with 842 of FIG. 8. The random access component 942 may be configured to transmit a second random access message 2 PDCCH, e.g., as described in connection with 850 of FIG. 8. The random access component 942 may be configured to transmit the second random access message 2 on a different grouping of monitoring occasions than the first random access message 2 PDCCH, e.g., as described in connection with 852 of FIG. 8. The random access component 942 may be configured to transmit the second random access message 2 PDCCH using a different RA-RNTI than the first random access message 2 PDCCH, e.g., as described in connection with 854 of FIG. 8. The random access component 942 may be configured to repeat the second random access message 2 PDCCH over multiple monitoring occasions, e.g., as described in connection with 856 of FIG. 8. The random access component 942 may be configured to transmit the second random access message 2 PDCCH on corresponding PDCCH candidates with a same aggregation level and location within the multiple monitoring occasion, e.g., as described in connection with 858 of FIG. 8. The random access component 942 may be configured to transmit an alternative size of DCI for the second random access message 2 PDCCH, e.g., as described in connection with 860 of FIG. 8. The communication manager 932 further includes a PDSCH component 944 that may transmit a first random access message 2 PDSCH based on the first random access message 2 PDCCH and a second random access message 2 PDSCH based on the second random access message 2 PDCCH, e.g., as described in connection with 870 of FIG. 8. The communication manager 932 further includes a coverage enhancement component 946 that determines whether to transmit the second random access message 2 according to the coverage enhanced monitoring procedure, e.g., as described in connection with 850 of FIG. 8. The coverage enhancement component 946 may be configured to receive the PRACH preamble for the second random access message 1 and determine whether the second random access message 1 is a request for enhanced coverage, e.g., as described in connection with 850 of FIG. 8. The coverage enhancement component 946 may be configured to determine that enhanced coverage is requested when the PRACH preamble is repeated following a pattern specified in the enhanced coverage configuration, e.g., as described in connection with 850 of FIG. 8. The coverage enhancement component 946 may be configured to indicate that the second random access message 1 has requested enhanced coverage, e.g., as described in connection with 850 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving, from a UE, a first random access message 1. The apparatus includes means for transmitting a first random access message 2 PDCCH during a first RAR window in response to the first random access message 1. The apparatus includes means for receiving a second random access message 1 during the RAR window. The apparatus includes means for transmitting a second random access message 2 PDCCH in response to the second random access message 1 during a second portion of the first RAR window for a coverage enhanced monitoring procedure that is different than a monitoring procedure for the first random access message 2 PDCCH. The apparatus includes means for transmitting a first random access message 2 PDSCH based on the first random access message 2 PDCCH and a second random access message 2 PDSCH based on the second random access message 2 PDCCH. The means for receiving the second random access message 1 is configured to utilize a coverage enhanced reception method. The means for transmitting the second random access message 2 PDCCH is configured to transmit on a different grouping of monitoring occasions than the first random access message 2 PDCCH. The means for transmitting the second random access message 2 PDCCH is configured to transmit the second random access message 2 PDCCH using a different random access radio network temporary identifier (RA-RNTI) than the first random access message 2 PDCCH. The means for transmitting the second random access message 2 PDCCH is configured to repeat the second random access message 2 PDCCH over multiple monitoring occasions. The means for transmitting the second random access message 2 PDCCH is configured to transmit the second random access message 2 PDCCH on corresponding PDCCH candidates with a same aggregation level and location within the multiple monitoring occasion. The means for transmitting the second random access message 2 PDCCH is configured to transmit an alternative size of DCI for the second random access message 2 PDCCH. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a UE comprising transmitting, from the UE, a first random access message 1; transmitting, from the UE, a second random access message 1 in response to determining that a first random access message 2 PDCCH has not been received during a first portion of a first RAR window; monitoring for the first random access message 2 PDCCH and a second random access message 2 PDCCH concurrently during a second portion of the first RAR window, wherein a coverage enhanced monitoring procedure for the second random access message 2 PDCCH is different than a monitoring procedure for the first random access message 2 PDCCH; receiving and decoding a random access message 2 PDCCH, the random access message 2 PDCCH being one of the first random access message 2 PDCCH or the second random access message 2 PDCCH; and monitoring for a random access message 2 PDSCH in response to decoding the random access message 2 PDCCH.

In Aspect 2, the method of Aspect 1 further includes that the monitoring procedure for the second random access message 2 PDCCH includes a different grouping of monitoring occasions than the monitoring procedure for the first random access message 2 PDCCH.

In Aspect 3, the method of Aspect 1 or 2 further includes that the monitoring procedure for the second random access message 2 PDCCH includes a different RA-RNTI than the monitoring procedure for the first random access message 2 PDCCH.

In Aspect 4, the method of any of Aspects 1-3 further includes that transmitting the second random access message 1 comprises utilizing a coverage enhanced transmission method.

In Aspect 5, the method of any of Aspects 1-4 further includes that transmitting the second random access message 1 comprises repeating a transmission of the second random access message 1.

In Aspect 6, the method of any of Aspects 1-5 further includes that the coverage enhanced monitoring procedure includes soft combining multiple PDCCH candidates over multiple monitoring occasions before decoding the second random access message 2 PDCCH.

In Aspect 7, the method of any of Aspects 1-6 further includes that corresponding PDCCH candidates with a same aggregation level and location within different monitoring occasions are combined.

In Aspect 8, the method of any of Aspects 1-7 further includes that the coverage enhanced monitoring procedure includes a second RAR window that overlaps the second portion of the first RAR window.

In Aspect 9, the method of any of Aspects 1-8 further includes that the coverage enhanced monitoring procedure includes monitoring for an alternative size of DCI for the second random access message 2 PDCCH.

In Aspect 10, the method of any of Aspects 1-9 further includes that the coverage enhanced monitoring procedure includes determining an alternative interpretation of a DCI for the second random access message 2 PDCCH.

In Aspect 11, the method of any of Aspects 1-10 further includes that a number of PDCCH candidates included in the monitoring procedure for the first random access message 2 PDCCH and the monitoring procedure for the second random access message 2 is greater than a limit; and further including dropping a subset of concurrent PDCCH candidates for the monitoring procedure for the first random access message 2 PDCCH.

Aspect 12 is a device including one or more processors and one or more memories in electronic communication with the one or more processors and storing instructions executable by the one or more processors to cause the device to implement a method as in any of Aspects 1-11.

Aspect 13 is a system or apparatus including means for implementing a method or realizing an apparatus as in any of Aspects 1-11.

Aspect 14 is a non-transitory computer readable storage medium storing instructions executable by one or more processors to cause the one or more processors to implement a method as in any of Aspect 1-11.

Aspect 15 is a method of wireless communication at a base station comprising receiving, from a UE, a first random access message 1; transmitting a first random access message 2 PDCCH during a first RAR window in response to the first random access message 1; receiving a second random access message 1 during the RAR window; transmitting a second random access message 2 PDCCH in response to the second random access message 1 during a second portion of the first RAR window for a coverage enhanced monitoring procedure that is different than a monitoring procedure for the first random access message 2 PDCCH; and transmitting a first random access message 2 PDSCH based on the first random access message 2 PDCCH and a second random access message 2 PDSCH based on the second random access message 2 PDCCH.

In Aspect 16, the method of Aspect 15 further includes that transmitting the second random access message 2 PDCCH includes transmitting on a different grouping of monitoring occasions than the first random access message 2 PDCCH.

In Aspect 17, the method of Aspect 15 or 16 further includes that transmitting the second random access message 2 PDCCH includes transmitting the second random access message 2 PDCCH using a different RA-RNTI than the first random access message 2 PDCCH.

In Aspect 18, the method of any of Aspects 15-17 further includes that receiving the second random access message 1 comprises utilizing a coverage enhanced reception method.

In Aspect 19, the method of any of Aspects 15-18 further includes that the second random access message 1 is repeated.

In Aspect 20, the method of any of Aspects 15-19 further includes that transmitting the second random access message 2 PDCCH comprises repeating the second random access message 2 PDCCH over multiple monitoring occasions.

In Aspect 21, the method of any of Aspects 15-20 further includes that transmitting the second random access message 2 PDCCH comprises transmitting the second random access message 2 PDCCH on corresponding PDCCH candidates with a same aggregation level and location within the multiple monitoring occasion.

In Aspect 22, the method of any of Aspects 15-21 further includes that the coverage enhanced monitoring procedure includes a second RAR window that overlaps the second portion of the first RAR window.

In Aspect 23, the method of any of Aspects 15-22 further includes that transmitting the second random access message 2 PDCCH comprises transmitting an alternative size of DCI for the second random access message 2 PDCCH.

In Aspect 24, the method of any of Aspects 15-23 further includes that the second random access message 2 PDCCH has an alternative interpretation of a DCI.

In Aspect 25, the method of any of Aspects 15-24 further includes transmitting a configuration indicating the coverage enhanced monitoring procedure.

Aspect 26 is a device including one or more processors and one or more memories in electronic communication with the one or more processors and storing instructions executable by the one or more processors to cause the device to implement a method as in any of Aspects 15-25.

Aspect 27 is a system or apparatus including means for implementing a method or realizing an apparatus as in any of Aspects 15-25.

Aspect 28 is a non-transitory computer readable storage medium storing instructions executable by one or more processors to cause the one or more processors to implement a method as in any of Aspect 15-25.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    transmitting, from the UE, a first random access message 1;
    transmitting, from the UE, a second random access message 1 in response to determining that a first random access message 2 control portion has not been received during a first portion of a first random access response (RAR) window;
    monitoring for the first random access message 2 control portion and a second random access message 2 control portion concurrently during a second portion of the first RAR window, wherein a coverage enhanced monitoring procedure for the second random access message 2 control portion is different than a monitoring procedure for the first random access message 2 control portion, wherein the coverage enhanced monitoring procedure comprises at least one of soft combining multiple control portion candidates over multiple monitoring occasions, monitoring for an alternative size of downlink control information (DCI) for the second random access message 2 control portion, or determining an alternative interpretation of the DCI for the second random access message 2 control portion;
    receiving and decoding a random access message 2 control portion, the random access message 2 control portion being one of the first random access message 2 control portion or the second random access message 2 control portion; and
    monitoring for a random access message 2 data portion in response to decoding the random access message 2 control portion.

2. The method of claim 1, wherein the monitoring procedure for the second random access message 2 control portion includes a different grouping of monitoring occasions than the monitoring procedure for the first random access message 2 control portion.

3. The method of claim 1, wherein the monitoring procedure for the second random access message 2 control portion includes a different random access radio network temporary identifier (RA-RNTI) than the monitoring procedure for the first random access message 2 control portion.

4. The method of claim 1, wherein transmitting the second random access message 1 comprises utilizing a coverage enhanced transmission method.

5. The method of claim 4, wherein transmitting the second random access message 1 comprises repeating a transmission of the second random access message 1.

6. The method of claim 1, wherein the coverage enhanced monitoring procedure includes the soft combining the multiple control portion candidates over the multiple monitoring occasions before the decoding the second random access message 2 control portion.

7. The method of claim 6, wherein corresponding control portion candidates with a same aggregation level and location within different monitoring occasions are combined.

8. The method of claim 1, wherein the coverage enhanced monitoring procedure includes a second RAR window that overlaps the second portion of the first RAR window.

9. The method of claim 1, wherein the coverage enhanced monitoring procedure includes the monitoring for the alternative size of the DCI for the second random access message 2 control portion.

10. The method of claim 1, wherein the coverage enhanced monitoring procedure includes the determining the alternative interpretation of the DCI for the second random access message 2 control portion.

11. The method of claim 1, wherein transmitting the second random access message 1 is in response to a measurement by the UE.

12. The method of claim 1, wherein a number of control portion candidates included in the monitoring procedure for the first random access message 2 control portion and the monitoring procedure for the second random access message 2 is greater than a limit; and
    further comprising dropping a subset of concurrent control portion candidates for the monitoring procedure for the first random access message 2 control portion.

13. An apparatus for wireless communication at a user equipment (UE), comprising:
    a memory; and
    at least one processor coupled to the memory and configured to:
        transmit, from the UE, a first random access message 1;
        transmit, from the UE, a second random access message 1 in response to determining that a first random access message 2 control portion has not been received during a first portion of a first random access response (RAR) window;

monitor for the first random access message 2 control portion and a second random access message 2 control portion concurrently during a second portion of the first RAR window, wherein a coverage enhanced monitoring procedure for the second random access message 2 control portion is different than a monitoring procedure for the first random access message 2 control portion, wherein the coverage enhanced monitoring procedure comprises at least one of soft combining multiple control portion candidates over multiple monitoring occasions, monitoring for an alternative size of downlink control information (DCI) for the second random access message 2 control portion, or determining an alternative interpretation of the DCI for the second random access message 2 control portion;

receive and decoding a random access message 2 control portion, the random access message 2 control portion being one of the first random access message 2 control portion or the second random access message 2 control portion; and monitor for a random access message 2 data portion in response to decoding the random access message 2 control portion.

14. The apparatus of claim 13, wherein the monitoring procedure for the second random access message 2 control portion includes a different grouping of monitoring occasions than the monitoring procedure for the first random access message 2 control portion.

15. The apparatus of claim 13, wherein the monitoring procedure for the second random access message 2 control portion includes a different random access radio network temporary identifier (RA-RNTI) than the monitoring procedure for the first random access message 2 control portion.

16. The apparatus of claim 13, wherein a number of control portion candidates included in the monitoring procedure for the first random access message 2 control portion and the monitoring procedure for the second random access message 2 is greater than a limit, wherein the at least one processor is further configured to:

drop a subset of concurrent control portion candidates for the monitoring procedure for the first random access message 2 control portion.

17. A method of wireless communication at a base station, comprising:

receiving, from a user equipment (UE), a first random access message 1;

transmitting a first random access message 2 control portion during a first random access response (RAR) window in response to the first random access message 1;

receiving a second random access message 1 during the first RAR window;

transmitting a second random access message 2 control portion in response to the second random access message 1 during a second portion of the first RAR window for a coverage enhanced monitoring procedure that is different than a monitoring procedure for the first random access message 2 control portion, wherein transmitting the second random access message 2 control portion comprises at least one of repeating the second random access message 2 control portion over multiple monitoring occasions or transmitting an alternative size of downlink control information (DCI) for the second random access message 2 control portion; and transmitting a first random access message 2 data portion based on the first random access message 2 control portion and a second random access message 2 data portion based on the second random access message 2 control portion.

18. The method of claim 17, wherein transmitting the second random access message 2 control portion includes transmitting on a different grouping of monitoring occasions than the first random access message 2 control portion.

19. The method of claim 17, wherein transmitting the second random access message 2 control portion includes transmitting the second random access message 2 control portion using a different random access radio network temporary identifier (RA-RNTI) than the first random access message 2 control portion.

20. The method of claim 17, wherein receiving the second random access message 1 comprises utilizing a coverage enhanced reception method.

21. The method of claim 20, wherein the second random access message 1 is repeated.

22. The method of claim 17, wherein transmitting the second random access message 2 control portion comprises the repeating the second random access message 2 control portion over the multiple monitoring occasions.

23. The method of claim 22, transmitting the second random access message 2 control portion comprises transmitting the second random access message 2 control portion on corresponding control portion candidates with a same aggregation level and location within the multiple monitoring occasions.

24. The method of claim 17, wherein the coverage enhanced monitoring procedure includes a second RAR window that overlaps the second portion of the first RAR window.

25. The method of claim 17, wherein transmitting the second random access message 2 control portion comprises the transmitting the alternative size of the DCI for the second random access message 2 control portion.

26. The method of claim 17, wherein the second random access message 2 control portion has an alternative interpretation of the DCI.

27. The method of claim 17, further comprising transmitting a configuration indicating the coverage enhanced monitoring procedure.

28. An apparatus for wireless communication at a base station, comprising:

a memory; and at least one processor coupled to the memory and configured to:

receive, from a user equipment (UE), a first random access message 1;

transmit a first random access message 2 control portion during a first random access response (RAR) window in response to the first random access message 1;

receive a second random access message 1 during the first RAR window;

transmit a second random access message 2 control portion in response to the second random access message 1 during a second portion of the first RAR window for a coverage enhanced monitoring procedure that is different than a monitoring procedure for the first random access message 2 control portion, wherein to transmit the second random access message 2 control portion comprises at least one of repetition of the second random access message 2 control portion over multiple monitoring occasions or transmission of an alternative size of downlink control information (DCI) for the second random access message 2 control portion; and transmit a first random access message 2 data portion based on the first random access message 2 control portion and a second random access message 2 data portion based on the second random access message 2 control portion.

29. The apparatus of claim 28, wherein transmitting the second random access message 2 control portion includes transmitting on a different grouping of monitoring occasions than the first random access message 2 control portion.

30. The apparatus of claim 28, wherein transmitting the second random access message 2 control portion includes transmitting the second random access message 2 control portion using a different random access radio network temporary identifier (RA-RNTI) than the first random access message 2 control portion.

\* \* \* \* \*